United States Patent
Kennedy et al.

[11] 3,805,827
[45] Apr. 23, 1974

[54] COMPRESSOR VALVE

[75] Inventors: Neal R. Kennedy; William A. Kennedy, Jr., both of Oklahoma City, Okla.

[73] Assignee: Corken Pump Company, Oklahoma City, Okla.

[22] Filed: June 6, 1972

[21] Appl. No.: 260,225

[52] U.S. Cl.... 137/516.17, 137/516.19, 137/516.21
[51] Int. Cl. .................... F16k 15/08, F16k 15/12
[58] Field of Search.......... 137/514, 516.11, 516.15, 137/516.17, 516.23, 525, 525.5, 516.19, 516.21, 512.15; 417/559, 564

[56] References Cited
UNITED STATES PATENTS

| 2,082,512 | 1/1937 | Richardson | 137/516.21 |
| 3,463,184 | 8/1969 | Kohler et al. | 137/516.11 X |
| 1,390,941 | 9/1921 | Wainwright | 137/525.5 X |
| 2,632,621 | 3/1953 | Gamble | 137/516.23 |

FOREIGN PATENTS OR APPLICATIONS

| 185,015 | 3/1956 | Germany | 137/516.23 |

Primary Examiner—William R. Cline
Attorney, Agent, or Firm—Clarence A. O'Brien; Harvey B. Jacobson

[57] ABSTRACT

A compressor valve, either suction or discharge, incorporating an assembled unit embodying a valve seat and bumper secured together by a center fastener with a valve plate disposed against the seat and a valve spring engaged with the bumper and the valve plate for operation of the valve plate. Located internally between the valve plate and valve spring is an internal spring device which serves as a spacer and lock washer to preclude relative vertical movement and relative rotational movement of the components which occurs during normal operation of a compressor when a conventional flat washer is used as a spacer. In addition, a locator is provided for connecting and locating the valve plate, valve spring and internal spring device to retain these components in a predetermined relationship.

8 Claims, 3 Drawing Figures

PATENTED APR 23 1974      3,805,827
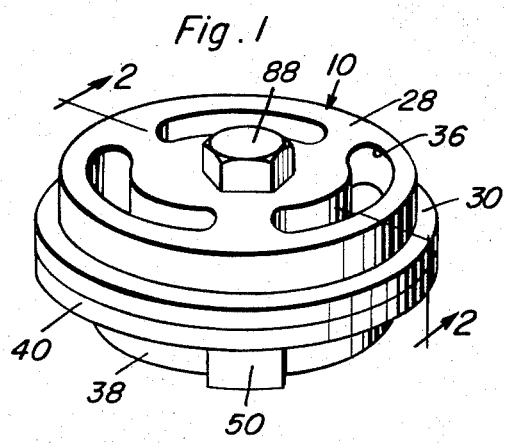
Fig. 1
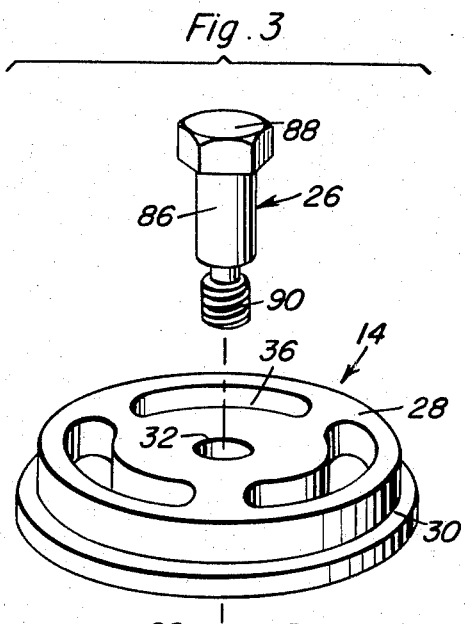
Fig. 3
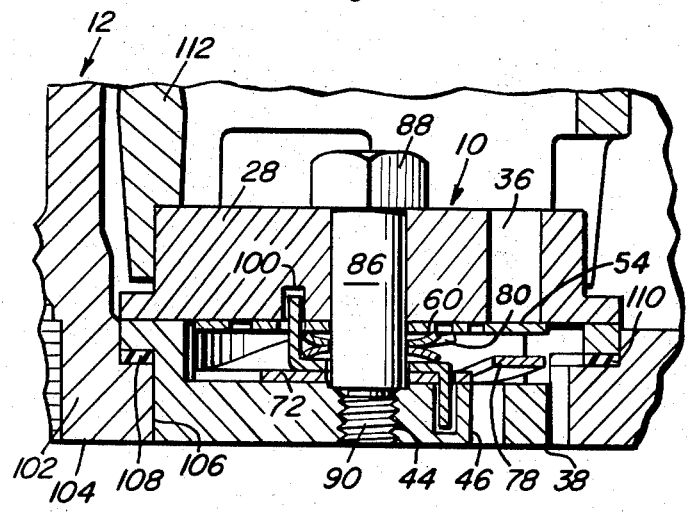
Fig. 2
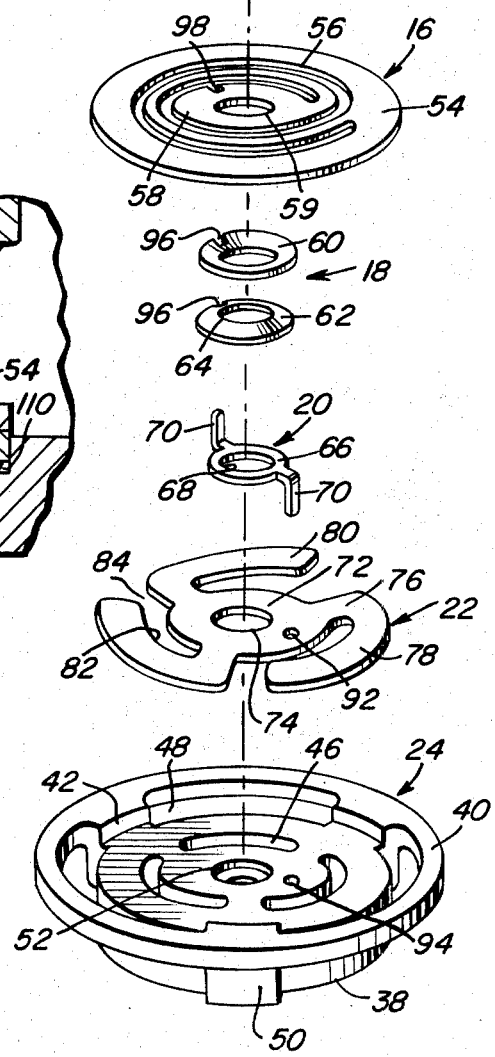

COMPRESSOR VALVE

BACKGROUND OF THE INVENTION

1. Field of the Invention

The present invention generally relates to a compressor valve and more particularly a compressor valve which may be employed either as a suction valve or as a discharge valve for a compressor and including an internal spring device and locator assembly to retain the components of the valve in proper orientation and preclude relative vertical and rotational movement between the components during operation thereof.

2. Description of the Prior Art

Compressor valves presently being employed utilize components such as a solid flat washer as a spacer, which require a tolerance fit. Due to the buildup of tolerance, there is always a small gap between the parts which allows the parts or pieces of the valve to move up and down slightly with each cycle thus causing wear. Also, there will be a slight rotational movement about a center post as a result of this gap which rotational movement will cause wear against the device that is used to keep the parts in proper relationship with each other. Conventionally, a pin is used to retain the components in proper relationship. Inasmuch as compressor valves are usually non-lubricated, the wear factor is substantially increased thus introducing a practical problem of repair and replacement of the parts. Also, in present valve structures, a lock washer or some other similar type of lock device must be used to hold the parts together and due to vibration and other conditions, such devices sometimes do not function properly thus allowing the components to become loose during operation.

SUMMARY OF THE INVENTION

An object of the present invention is to provide a compressor valve in which substantially all metal-to-metal rubbing has been eliminated with the exception of the relative movement between the valve spring and the valve plate thereby virtually eliminating all undesirable wear.

This is attained by the use of an internal spring device disposed between the valve plate and the valve spring which serves as a spacer and will take up for the tolerances of the valve parts thus securing all of the parts together solidly and preventing any vertical movement of the valve pieces. The internal spring device or spacer will also prevent the parts from rotating and will keep sufficient axial load on the center bolt such that it will perform as a lock washer. Further, a locator is provided for orienting the components of the valve in their proper angular orientation about the center bolt for providing for proper operation of the valve with the components all being separable from each other to enable replacement when necessary or desired.

A further object of the invention is to provide a compressor valve, either suction or discharge, which is relatively simple in construction, long lasting due to reduction in wear, easy to assemble and disassemble and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the compressor valve of the present invention.

FIG. 2 is a vertical sectional view of the compressor valve illustrating the association thereof with components of a compressor.

FIG. 3 is an exploded, group perspective view of the valve illustrating the relationship of the components thereof.

DESCRIPTION OF THE PREFERRED EMBODIMENT

Referring now specifically to the drawings, the compressor valve of the present invention is generally designated by reference numeral 10 for association with a compressor which is partially disclosed in FIG. 2 and is designated by reference numeral 12.

As illustrated in FIG. 3, the valve 10 includes a valve seat 14, a valve plate 16, an internal spring device 18, a locator 20, a valve spring 22 and a bumper 24 with all of these components being secured in assembled relation by a fastening device or bolt 26.

The valve seat 14 includes a circular body 28 having a peripheral flange 30 at the inner end thereof, a central hole 32 extending therethrough and a plurality of circumferentially spaced arcuate ports 36 extending therethrough. The bumper 24 also includes a circular or cylindrical body 38 having a peripheral flange 40 at the inner edge thereof, a central recessed area 42 disposed inwardly of the flange 40, a central internally threaded hole or bore 44, a plurality of arcuate circumferentially spaced inner slots 46 and a plurality of arcuate circumferentially spaced outer slots 48 which communicate with the exterior of the body 38 and are defined by connecting lug portions 50 that connect the flange 40 with the body 38 so that the slots 48, in effect, open longitudinally and radially of the body 38. The center hole 44 is counterbored or countersunk slightly at the end thereof where it communicates with the recessed surface 42 as indicated by reference numeral 52.

The valve plate 16 is in the form of a substantially flat disk or plate 54 that is of circular configuration and of a size to fit within the recess 42 in the bumper 24. The plate 54 is provided with a spiral slot 56 therein which extends inwardly from a point spaced radially inwardly from the outer edge of the plate 54 and terminates in a manner to define a central plate or portion 58 having a central aperture 59 therein in alignment with the holes 32 and 44. The spiral slot 56 enables the outer portion of the plate 54 to move vertically in relation to the ports 36 when assembled with the outer solid portion of the plate 54 normally overlying and closing the ports 36 when the valve is assembled.

The internal spring device 18 is disclosed as a pair of Belleville washers 60 and 62 each of which is provided with a central aperture or hole 64 in alignment with the other holes or apertures along the center of the valve. The Belleville washers 60 and 62 are oppositely disposed, that is, their inner peripheral edges are engaged with each other and their outer peripheral edges are spaced apart thus forming a spring device. This spring device acts as a combination lock washer and valve spacer which will take up any and all tolerances built-up by the other parts of the valve in a manner described hereinafter. While a Belleville washer has been disclosed, other internal spring devices may be employed such as a wave washer, standard lock washer, slant-coil spring, or any other similar device or devices so that the internal spring device 18 serves as a spacer and a spring device to act both as a lock washer and as a take-up device for eliminating tolerances thereby eliminating relative vertical movement of the components and relative rotational movement of the components.

The locator 20 includes an annular member 66 having a central hole or aperture 68 therein in alignment with the other holes and apertures and a pair of oppositely extending, axial pins or prongs 70 at diametrically opposed points thereon.

The valve spring includes a central plate or disk 72 having a central hole or aperture 74 therein for alignment with the other holes and apertures. A plurality of radially extending portions 76 are provided on the central plate 72 with the outer edge portion of each radially extending web 76 including an arcuately extending plate 78 having an outer edge defining a circle about the center of the valve spring. The free ends of the circumferentially extending portion 78 is curved out of the plane of the central portion 72 as designated by the numeral 80 with the resiliency of this portion of the spring 22 assuring contact with the outer portion of the valve plate 16. The free end of the spring portion 80 and the inner edge of the circumferential portion 78 and the limits of the radial member 76 are defined by a a plurality of circumferentially spaced slots 82 which are arcuate in their inner portion and extend radially outwardly at their end portion as designated by numeral 84.

The bolt 26 includes a major cylindrical portion 86 with a polygonal head 88 at one end and a reduced threaded end 90 opposite to the head 88 for threaded engagement with the internally threaded bore 44 in the bumper 24. The cylindrical portion 86 of the bolts 26 is received in the holes or apertures 32, 59, 64, 68, 74 and the counterbore 52 when the threaded portion 90 is received in the threaded bore 44 and the head 88 engages the upper surface of the cylindrical body 28 so that the facing surfaces of the flanges 30 and 40 are clamped rigidly together as illustrated in FIG. 2 with these flanges being in metal-to-metal contact when assembled.

As illustrated in FIG. 2, the valve plate 16 is disposed against the inner surface of the valve seat 28 and the valve spring 22 is disposed against the inner surface of the bumper 24 and received in the recessed area 42 therein with the end portions or spring portions 80 engaging the surface of the valve plate 54 which underlies the ports 36 in the valve seat 14. The internal spring device 18 is disposed between the valve plate 16 and the valve spring 22 and the locator 20 is disposed between the internal spring device 18 and the valve spring 22 with the downwardly extending prong 70 on the locator extending through a small aperture 92 in the valve spring 22 and extending into a blind bore 94 in the body 38 which as indicated in FIG. 2 does not extend all the way through the body 38. The upwardly extending prong 70 extends upwardly through aligned notches 96 in each of the Belleville washers 60 and 62 and then upwardly through a notch 98 in the periphery of the central portion 58 of the valve plate 16 and then extends upwardly into a blind bore 100 in the valve seat body 28 as illustrated in FIG. 2 thus retaining all of the components of the valve 10 in properly oriented relationship about the vertical centerline of the valve with the prongs 70 being removably received in the related apertures, bores and notches so that the components may be separated from each other for replacement when desired. When assembled, the bottom end of the cylindrical portion 86 of the bolt 26 is received in the counterbore 52 in a manner so that the cylindrical portion 86 extends through all of the components of the valve and fits relatively close in relation to the apertures and holes in which it is received but sufficiently loosely therein to enable removal of and replacement of the component parts. The Belleville washers 60 and 62 provide sufficient resilient force to retain the valve plate and valve spring in spaced relation at the central portion thereof to prevent relative vertical movement of these components and also to prevent relative rotational movement of the components and the axial force exerted by the Belleville washers serves the dual purpose of providing a lock for the bolt 26 thereby eliminating the necessity of employing a lock washer or other separate locking device for the assembling bolt 26.

FIG. 2 illustrates the valve 10 associated with a compressor head 102 which includes a bottom surface 104 which has a recess 106 therein of circular configuration for closely receiving the lower portion of the valve in which the bottom surface of the bumper 24 is flush with the inner surface of the head 102 as illustrated. A shoulder 108 is formed in the head above the inner surface thereof for supporting engagement with the flange 40 of the valve bumper 24 and a suitable gasket 110 is provided between the shoulder 108 and the flange 40 to seal the valve 10 in relation to the compressor head 102. The upper end of the valve 10, particularly the valve seat 14 is engaged by a valve cage member 112 which is held in place by a removable cover plate and holddown screw and nut all of which represent conventional construction and which are removable to enable removal of the valve assembly 10 when deemed necessary. The valve as illustrated is a suction type valve but the valve may be employed as a discharge valve except that it is inverted and the structure has to be rearranged so that the bolt comes from the top side of the valve whether it be used as a suction valve as illustrated or as a discharge valve.

The internal spring device 18, illustrated as Belleville washers 60 and 62, serves as both a spacer and lock washer which takes up any and all tolerances built-up by the other parts of the valve. When the valve is assembled, the valve seat 14 and valve bumper 24 must make metal-to-metal contact. The valve plate 16, the locator 20 and the valve spring 22 must be held rigidly in place with no vertical or rotational movement. In existing devices, a solid flat washer is used as a spacer and as a result there is always a small gap between these parts as a result of tolerance buildups which allows the pieces to move up and down slightly with each cycle thus causing wear. Also, due to this slight gap, there will be slight rotational movement about the center post which also causes wear against whatever device is used to keep the parts in proper relationship with one another. Because the compressor valves are non-lubricated, the wear factor is increased due to the relative movement, both vertical and rotational. Also, in present valves, some type of locknut or nut with a lock washer is used in order to hold the valve parts in assembled relation during operation to prevent them from loosening due to vibration and relative movement. The spacer or internal spring device, one or more Belleville washers, wave washers, standard lock washers, slant-coil springs or any other similar device, will not eliminate the vertical movement of the parts but will also prevent the parts from rotating therefore eliminating all metal-to-metal rubbing with the exception of the engagement of the valve spring portions 80 with the valve plate portion 54. Thus, virtually all undesirable wear has been eliminated and this spacer or internal spring device 16 also accomplishes the dual function of providing sufficient axial load or pressure on the bolt 26 so that the internal spring device or spacer 18 will perform as a lock washer to prevent the bolt from loosening.

Also, in present valves, a pin is used to locate the components in their necessary relation. The pin is usually pressed either into the valve seat 14 of the valve bumper 24. If this pin is broken or is worn into two pieces, it cannot be removed thus necessitating that a new hole be drilled and a new pin pressed into that hole. The locator 20 of this invention effectively locates all of the parts correctly with the locator being rigidly held in place but it is not pressed into the locator holes or notches. The spacer or internal spring device 18 holds the locator in place so it is not necessary that the prongs 70 of the locator be tightly fitted in the holes and notches. Therefore, even if the prongs should break off, the locator can be easily removed from the hole and replaced. The vertical dimensions of the valve seat 14 and the valve bumper 24 are maintained equal as is the vertical height between the flange and the respective outer surface so that the valve assembly may be employed as either a suction or intake valve and a discharge or outlet valve by inverting the valve in relation to the compressor head. Also, the valve components may be constructed of conventional, long lasting, metallic components employed in valve structures of this type.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A valve for a compressor or the like comprising a valve seat having a port therein, a valve plate engaged with the seat for closing the port, a disc-type valve spring engaged with the plate to resiliently bias it to closed position, a bumper engaged with said valve spring to retain it in position, and centrally disposed resilient spacer means disposed between and engaging the valve plate and valve spring to resiliently space the center of the plate and spring apart to prevent relative movement of the center portion of the components thereby eliminating wear due to looseness of the parts that is caused by a build-up of tolerances between the parts when assembled, said valve seat and bumper being in the form of substantially cylindrical bodies, central means extending through said bodies and securing the valve seat and bumper together, said valve seat and bumper including contacting flanges with the central area of the assembled valve seat and bumper including an annular recess receiving the valve plate, valve spring and spacer means.

2. The structure as defined in claim 1 wherein said valve plate is in the form of a circular disk having a central portion and an outer portion interconnected by a resilient connecting portion with the outer portion overlying and closing the port in the valve seat when in closed position, said valve spring including a substantially flat disk member having a circumferentially extending leaf spring with the terminal end thereof being free of the disk member and deflected axially thereof for engagement with the outer peripheral portion of the valve plate.

3. The structure as defined in claim 2 wherein said spacer means includes an internal spring device disposed between the central portions of the valve spring and valve plate to resiliently retain them spaced apart and exert axial pressure thereon to prevent relative rotation therebetween and to serve as a locking device for retaining the parts of the valve assembled.

4. The structure as defined in claim 3 together with a locator interconnecting the valve seat, valve plate, internal spring device, valve spring and bumper to orientate these components in proper orientation.

5. A valve for a compressor or the like comprising a valve seat having a port therein, a valve plate engaged with the seat for closing the port, a valve spring engaged with the plate to resiliently bias it to closed position, a bumper engaged with said valve spring to retain it in position, and spacer means between the valve plate and valve spring to resiliently space the plate and spring apart to prevent relative movement towards and away from each other, thereby eliminating wear due to looseness of the parts that is caused by a build-up of tolerance between the parts, said valve seat and bumper being in the form of substantially cylindrical bodies, a central bolt extending through said bodies and securing the valve seat and bumper together, said valve seat and bumper including contacting flanges with the central area of the assembled valve seat and bumper including an annular recess receiving the valve plate, valve spring and spacer means, said valve plate being in the form of a circular disk having a central portion and an outer portion interconnected by a resilient connecting portion with the outer portion overlying and closing the port in the valve seat when in closed position, said valve spring including a substantially flat disk member having a circumferentially extending leaf spring with the terminal end thereof being free of the disk member and deflected axially thereof for engagement with the outer peripheral portion of the valve plate, said spacer means including an internal spring device disposed between the central portions of the valve spring and valve plate to resiliently retain them spaced apart and exert axial pressure thereon to prevent relative rotation therebetween and to serve as a locking device for retaining the parts of the valve assembled, a locator interconnecting the valve seat, valve plate, internal spring device, valve spring and bumper to orientate these components in proper orientation, said locator including an annular member having oppositely extending prongs interlockingly engaged with the components of the valve.

6. A valve comprising a valve seat having a port communicated therewith, a plate-type valve member having a portion engageable with the valve seat for selectively closing said port, a valve spring having a portion resiliently engaging the portion of the valve member forming a closure for the port to bias it toward port closing position, a valve body engaged with said spring to retain it in position, means retaining said valve seat, valve member, valve spring and valve body in assembled position, locator means positively engaged with said valve seat, valve member, valve spring and valve body to retain them in non-rotative relation to each other, and an internal spring means disposed between the center of the valve member and valve spring and being disposed in spaced relation to the portion of the valve member that closes the port to resiliently take up any looseness or tolerance between the valve member and valve spring to reduce wear.

7. The structure as defined in claim 6 wherein said valve seat, valve member, valve spring and valve body are circular in configuration, said valve seat and valve body each including a peripheral portion for abutting engagement and defining an internal recess receiving the valve member, valve spring, locator means and internal spring means, said retaining means including a bolt extending through all of said components at the center thereof, said valve body having a port therein communicating with the recess, said locator means including an annular member having axially extending locating prongs spaced radially from the bolt and extending into coacting cavity forming means in the valve seat, valve member, internal spring means, valve spring and valve body to prevent relative rotation of these components.

8. A valve for a compressor or the like comprising a valve seat having a port therein, a valve plate engaged with the seat for closing the port, a valve spring engaged with the plate to resiliently bias it to closed position, a bumper engaged with said valve spring to retain it in position, and resilient spacer means between the valve plate and valve spring to resiliently space the center of the plate and spring apart to prevent relative movement of the center portion of the components thereby eliminating wear due to looseness of the parts that is caused by a build-up of tolerances between the parts when assembled said valve seat and bumper being substantially cylindrical and include contacting peripheral flanges with the central area being recessed thereby providing an annular recess receiving the valve plate, valve spring and spacer means when the flanges are in metal-to-metal contact, said valve plate being in the form of a circular disc having a central portion and an outer portion interconnected by a resilient connecting portion, the outer portion of the valve plate overlying and closing the port in the valve seat when in closed position, said valve spring including a substantially flat disc member having a circumferentially extending leaf spring with the terminal end thereof being free of the disc member and deflected axially thereof for engagement with the outer peripheral portion of the valve plate, said spacer means including an internal spring device disposed between the central portions of the valve spring and valve plate to resiliently retain them in position to prevent relative movement between the central portions thereof, locator means interconnecting the valve seat, valve plate, internal spring device, valve spring and bumper to properly orientate these components and prevent relative rotation therebetween, said locator including a central portion disposed between the spring device and valve spring and axially extending prongs extending into cavities provided therefor with one prong extending through the valve spring into the bumper and the other prong extending through the spring device, valve plate and into the valve seat.

* * * * *